Patented May 10, 1932

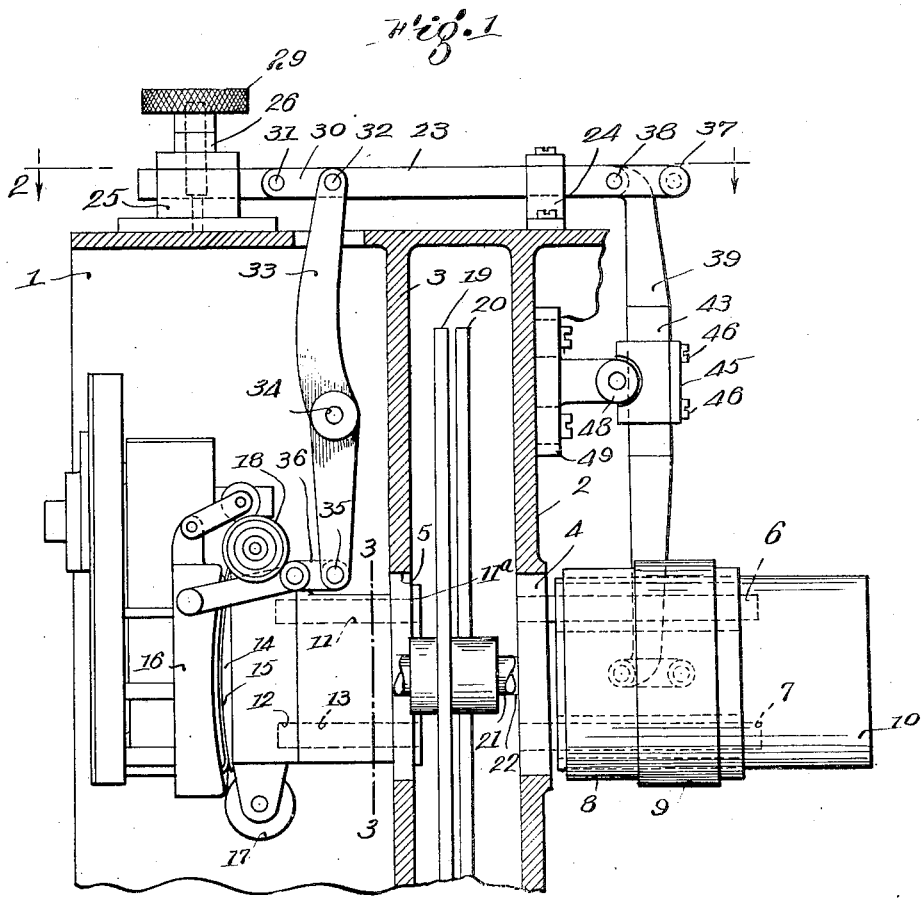
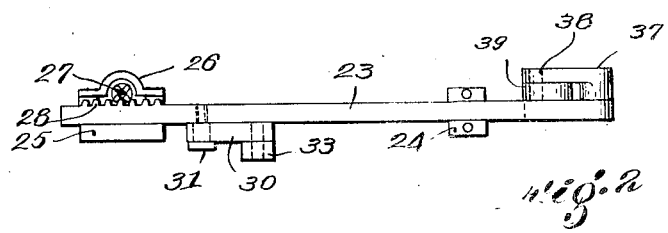
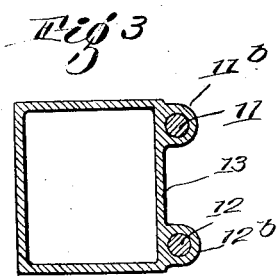

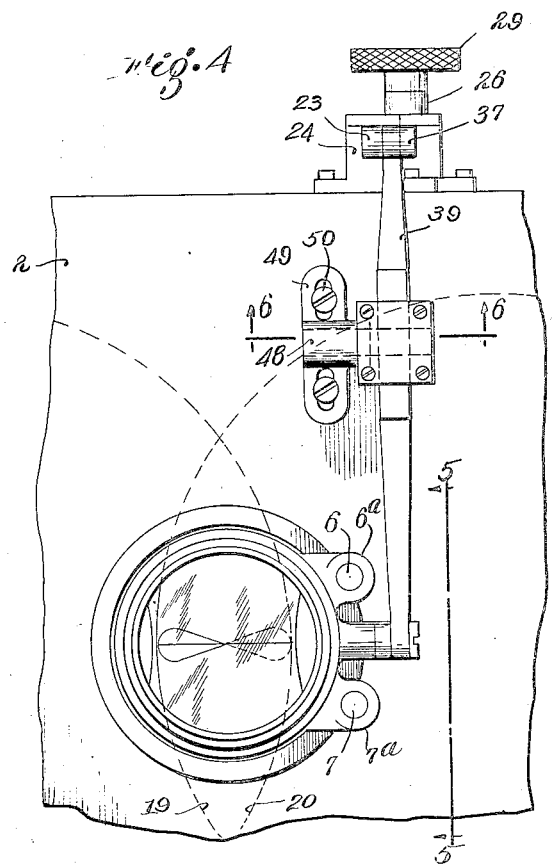
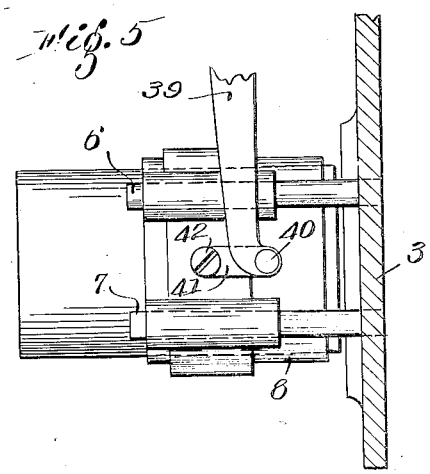
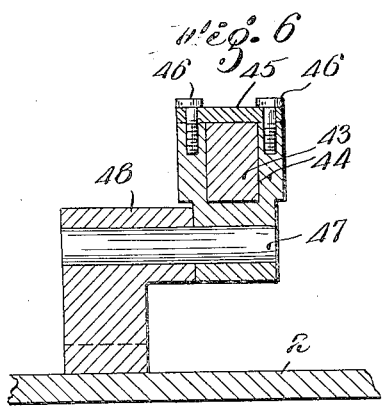

1,857,152

UNITED STATES PATENT OFFICE

ARTHUR J. HOLMAN, OF BRIGHTON, MASSACHUSETTS

COMBINED FOCUS AND IMAGE PLACEMENT ADJUSTMENT MEANS FOR MOVING PICTURE PROJECTORS

Application filed August 18, 1927. Serial No. 213,794.

My invention relates to a moving picture projector of the optical rectifying type wherein the aperture gate is elongated vertically so as to present more than two film pictures to the beam of light from the condenser system. This condition gives rise to problems of exact registration of superimposed images upon the screen, as superimposition of images exists during the greater part of the picture cycle. Projectors of the optical rectifying type employing a dissolving action of successive images must embody means for adjustment to compensate conditions of varying film shrinkage, which shrinkage causes a variation of distance between centers of film pictures, as between one reel of film and another. Hence, when the optical system of the projector is adjusted to project properly one reel of film, it may require readjustment to project properly another reel of film of different age or physical condition.

It has been the special object of my invention to provide a means whereby the front objective and the aperture unit of a projecting apparatus, of the type shown in my Letters Patent of the United States No. 1,584,098 dated May 11, 1926, may be simultaneously and variously moved and positioned along the optical axis for focus and shrink adjustment purposes by the simple manipulation of a single hand adjusting wheel, instead of employing two separate adjusting means as in the case of said patented device.

My device may be best understood by reference to the accompanying drawings in which Fig. 1 is a side view of my device embodied in a projector of the type shown in my said patent with a portion of the frame shown in vertical cross-section; the film feeding mechanism not being shown.

Fig. 2 is a top view of the rack-bar actuating mechanism, shown partly in cross-section on line 2—2 of Fig. 1.

Fig. 3 is a cross-section on line 3—3 of Fig. 1.

Fig. 4 is a front view showing the means for actuating the front objective and adjusting the relative movement thereof.

Fig. 5 is a cross-section and view of the front objective mount on line 5—5 of Fig. 4.

Fig. 6 is a cross-section on line 6—6 of Fig. 4.

Referring now more particularly to the drawings, 1 is the frame of the projector having vertical transverse webs 2 and 3 provided with apertures 4 and 5 symmetrically located with respect to the optical axis. Fixed within the web 2 are the posts 6 and 7 upon which is slidably mounted a cylindrical objective mount 8 provided with an integral stiffening ring 9. The objective mount 8 is provided with bosses $6^a$ and $7^a$ within which the posts 6 and 7 enter with a close sliding fit. Within the objective mount 8 is slidably mounted, with a close friction fit, the objective tube 10 within which is mounted the front objective lens in the usual manner.

Fixed within the web 3 are rearwardly extending posts 11 and 12 located upon one side of the aperture 5 in the web 3 which is strengthened at this point by the bosses $11^a$ and $12^a$. Slidably mounted upon the posts 11 and 12 is the aperture frame 13 (Figs. 1 and 3) which is provided with bosses $11^b$ and $12^b$ within which the posts 11 and 12 enter with close sliding fit. The aperture frame 13 carries suitable element for guiding and positioning the film strip with respect to the aperture such as the aperture plate 14, a spring pad 15 for holding the film strip against the aperture plate, a slidable gate block 16, a sprocket 17, and a guide roller 18.

Located between webs 2 and 3 are a pair of overlapping rotatable lens discs 19 and 20 arranged and mounted on parallel shafts 21 and 22 as described in my said patent so that they overlap adjacent the optical axis in the manner indicated by the dotted lines indicating their circumferences in Fig. 4.

On the top of the frame 1 is slidably mounted the rack-bar 23, the forward end of which passes through a slotted bracket 24 attached to the top of frame 1, and the rearward end of which passes through a slotted bracket 25 also attached to the top of frame 1. The bracket 25 is provided with an integral boss 26 within which is mounted a pinion 27 which meshes with a rack 28 on the rack-bar 23. A hand wheel 29 is mounted on the shaft of pinion 27. A link 30 is attached by the pivot 31 to the rack-bar 23 and by the pivot 32 to a lever arm 33 which pivots on the pin 34 fixed on frame 1. The lower end of the lever arm 33 is attached by pivot 35 to a link 36 which is pivotally attached to the aperture frame 13.

Upon the forward end of the rack-bar 23 pivotally mounted is a link 37 which carries a pivot pin 38 upon which is pivotally mounted the upper end of lever arm 39, the lower end of which is connected by pivot 40 to the link 41 which in turn is connected by pivot screw 42 to the objective mount 8.

A portion 43 of the lever arm 39 is provided with parallel sides which fit into a slotted fulcrum block 44 which may be clamped tightly to the lever 39 by the plate 45 and screws 46. The fulcrum block 44 is pivoted on pin 47, which is fast in the adjustably mounted bracket 48 which is provided in its base 49 with slots through which pass retaining screws 50 which enter web 2.

The extent of movement of the objective as compared with the extent of movement of the aperture unit when adjusting the relative positions of these members with respect to the revolving lens discs, which constitute the rear objective the positions of which are fixed, is invariably greater, as will be evident from an examination of the formulæ hereinafter stated.

As the movement of the rack-bar 23 influences equally the upper ends of levers 33 and 39 it will be readily understood that the extent of movement required by each at its lower end may be obtained by properly locating the fulcrums of the levers.

The relative movements of the aperture unit and front objective may be obtained by using the general equations of the optical system given below.

$$C = K - f_1 \frac{x}{z-x}$$

$$D = f_1 \frac{x}{z}$$

wherein $C$ = distance from equivalent center of revolving system to equivalent center of front objective.

$D$ = distance from equivalent center of revolving system to film position on the optical axis.

$K$ is a constant depending on projection distance and focal length of front objective.

$f_1$ = focal length of a pair of coacting revolving disc lenses.

$x = \frac{1}{2}$ distance between centers of successive film pictures.

$z = \frac{1}{2}$ distance between optical centers of an adjacent pair of lenses on the revolving discs.

For unshrunken film the distance between centers of film pictures = .750″, therefore $x = .375″$.

For varying amounts of shrink the value of $x$ will vary, the greater the shrink the smaller the value of $x$.

Assuming that $z = 1″$ and assuming values of $x$, the following can be worked out from the above equations:

| X | D | Difference | C | Difference |
|---|---|---|---|---|
| .375 | $.375f_1$ |  | $K - .6000f_1$ |  |
|  |  | $.005f_1$ |  | $.0127f_1$ |
| .370 | $.370f_1$ |  | $K - .5873f_1$ |  |
|  |  | $.005f_1$ |  | $.0125f_1$ |
| .365 | $.365f_1$ |  | $K - .5748f_1$ |  |
|  |  | $.005f_1$ |  | $.0123f_1$ |
| .360 | $.360f_1$ |  | $K - .5625f_1$ |  |

The above values of $x$ include all conditions of shrink which will be met in commercial practice. It will be observed that $D$ varies as a straight line function of $x$ but the values of $C$ vary slightly more rapidly than a straight line function of $x$ but the departure from a straight line function is so very slight over the normal range of shrink that no appreciable error is made if $C$ is treated as a straight line function of $x$. In order to find the ratio of movement required it is advisable to use the difference values from the middle line above, which gives $$\frac{.0125f_1}{.005f_1} = 2.5$$

Therefore, the front objective must have a movement of 2.5 times that of the aperture unit.

It will be observed that in my device as described the location of the fulcrum block of the lever 39 is adjustable and may be altered by releasing screws 50 and 46 and sliding the bracket 48 on the web 2 and the fulcrum block 44 on the flattened portion 43 of the lever 39. This fulcrum shift is procured without displacing the lever 39 vertically. I have provided such an adjustment in case it is desired to substitute revolving rotatable lens discs having different constants than those for which the mean position of the adjustable fulcrum has been calculated. It is obvious that this adjustable fulcrum provides for adjusting the ratio of movement and may be applied to either lever.

The front objective tube 10 is adjusted in the mount for sharp focus for a given projection distance with any reel of film after the aperture unit has been adjusted, by turning the hand wheel 29, so as to obtain exact registration of superimposed images on the screen. The correct focus and exact registration of images for any other reel of film, whatever may be its shrunken condition, is obtained by observing the screen image and simply manipulating the hand wheel 29 so as to move the aperture unit and front objective in the ratio established in the lever arms and thus fulfill the requirements of the optical system as given by the above formula.

This automatic adjustment of the front objective to a change of the film position at the aperture is a great advantage over the means shown in my said patent in that there a maladjustment of either independent adjusting means would introduce an error in the setting of the other and hence made it difficult to find the best setting for both. By the use of my device herein described the operator may obtain correct projection by simply observing the screen image and turning slightly backward and forward the hand wheel 29 until the desired clearness of image is obtained— an operation which requires but a few seconds.

Having thus fully described my invention, what I claim is:—

1. In a device of the character specified, the combination of movable optical rectifying means comprising a pair of overlapping rotatable lens discs, a slidably mounted aperture unit, a slidably mounted front objective, and actuating means for adjusting said aperture unit and said front objective, said actuating means being provided with a common control member and adapted variously to position said aperture unit and said front objective according to the requirements for compensating variation in spacing of film picture centers.

2. In a device of the character specified, the combination of movable optical rectifying means comprising a pair of overlapping rotatable lens discs, a slidably mounted aperture unit, a slidably mounted front objective, an actuating member connected to said aperture unit, a second actuating member connected to said front objective, and a common control means for said actuating members, said actuating members being arranged to produce the required proportionate displacements of said aperture unit and said front objective, the one moving toward and the other away from said optical rectifying means under the influence of said common control means.

3. In a device of the character specified, the combination of movable optical rectifying means comprising a pair of overlapping rotatable lens discs, a slidably mounted aperture unit, a slidably mounted front objective, a lever connected at one end to said aperture unit, a second lever connected at one end to said front objective, and a common control member connected to said levers the fulcrums of which are so located as to produce the required proportionate displacements of said aperture unit and said front objective, the one moving toward and the other away from said optical rectifying means under the influence of said common control member.

4. In a device of the character specified, the combination of movable optical rectifying means comprising a pair of overlapping rotatable lens discs, a slidably mounted aperture unit, a slidably mounted front objective, a lever connected at one end to said aperture unit, a second lever connected at one end to said front objective, a common control member connected to said levers the fulcrums of which are so located as to produce the required proportionate displacements of said aperture unit and said front objective, the one moving toward and the other away from said optical rectifying means under the influence of said common control member, and means for adjusting the position of the fulcrum of one of said levers.

ARTHUR J. HOLMAN.